US009731399B2

(12) United States Patent
Martin et al.

(10) Patent No.: US 9,731,399 B2
(45) Date of Patent: Aug. 15, 2017

(54) COATED RETAINING RING

(71) Applicant: Applied Materials, Inc., Santa Clara, CA (US)

(72) Inventors: Daniel L. Martin, Cupertino, CA (US); Jeonghoon Oh, San Jose, CA (US); Simon Yavelberg, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 319 days.

(21) Appl. No.: 14/505,231

(22) Filed: Oct. 2, 2014

(65) Prior Publication Data
US 2015/0099437 A1 Apr. 9, 2015

Related U.S. Application Data

(60) Provisional application No. 61/887,027, filed on Oct. 4, 2013.

(51) Int. Cl.
| | |
|---|---|
| *B24B 37/32* | (2012.01) |
| *C09D 127/18* | (2006.01) |
| *C09D 165/04* | (2006.01) |
| *B05D 1/00* | (2006.01) |
| *B05D 7/00* | (2006.01) |
| *B05D 1/08* | (2006.01) |

(52) U.S. Cl.
CPC ............... *B24B 37/32* (2013.01); *B05D 1/08* (2013.01); *B05D 1/60* (2013.01); *B05D 7/52* (2013.01); *C09D 127/18* (2013.01); *C09D 165/04* (2013.01)

(58) Field of Classification Search
None
See application file for complete search history.

(56) References Cited

U.S. PATENT DOCUMENTS

| | | | |
|---|---|---|---|
| 6,251,215 B1 | 6/2001 | Zuniga et al. | |
| 2004/0137739 A1 | 7/2004 | Korthuis et al. | |
| 2004/0200733 A1 | 10/2004 | Wadensweiler et al. | |
| 2008/0119122 A1* | 5/2008 | Zuniga | B24B 37/30 451/398 |

(Continued)

FOREIGN PATENT DOCUMENTS

KR 20060044770 A 5/2006

OTHER PUBLICATIONS

International Search Report and Written Opinon for PCT Application No. PCT/US2014/058849 dated Jan. 14, 2015; 11 total pages.

*Primary Examiner* — Ramsey Zacharia
(74) *Attorney, Agent, or Firm* — Patterson + Sheridan, LLP

(57) ABSTRACT

A retaining ring for a polishing system is disclosed. The retaining ring has a process-resistant coating over a portion thereof. The process-resistant coating is a thin, smooth, conformal layer that is resistant to wear and chemical attack. The process-resistant coating is formed by a method that includes vapor deposition from a precursor gas mixture, which may deposit polyparaxyxylene from a gas mixture comprising paracyclophane. Adhesion of the process-resistant coating to the retaining ring may be enhanced by treating the surface of the ring prior to forming the coating. Resistance of the coating to the process may be further enhanced by treating the surface of the coating with an etching or deposition gas to impart texture.

13 Claims, 3 Drawing Sheets

(56) References Cited

U.S. PATENT DOCUMENTS

| | | | |
|---|---|---|---|
| 2009/0242125 A1* | 10/2009 | Paik | B24B 37/30 |
| | | | 156/345.12 |
| 2009/0246402 A1* | 10/2009 | Mataki | G01T 1/246 |
| | | | 427/534 |
| 2013/0065495 A1 | 3/2013 | Gajendra et al. | |

* cited by examiner

US 9,731,399 B2

COATED RETAINING RING

CROSS-REFERENCE TO RELATED APPLICATIONS

This application claims benefit of U.S. Provisional Patent Application Ser. No. 61/887,027, filed Oct. 4, 2013, and incorporated herein by reference.

FIELD

Embodiments of the invention relate to polishing systems for polishing a substrate, such as a semiconductor substrate. More particularly, to a method and apparatus for monitoring components of a polishing system.

BACKGROUND

Chemical mechanical polishing (CMP) is one process commonly used in the manufacture of high-density integrated circuits to planarize or polish a layer of material deposited on a substrate. The substrate may be provided to a polishing station on a polishing system and retained in a carrier head that controllably urges the substrate against a moving polishing pad. CMP is effectively employed by providing contact between a feature side of the substrate and moving the substrate relative to the polishing pad while in the presence of a polishing fluid. Material is removed from the feature side of the substrate that is in contact with the polishing surface through a combination of chemical and mechanical activity.

The carrier head typically includes a retaining ring that circumscribes the substrate and may facilitate holding of the substrate in the carrier head. One or more surfaces of the retaining ring are typically in contact with the polishing pad and with polishing materials during polishing. While the retaining ring is typically adapted to endure polishing of multiple substrates, the surfaces that are in contact with the polishing pad experience wear and periodic replacement of the retaining ring is necessary.

Therefore, there is a need for a method and apparatus that improves durability of the retaining ring in a polishing system.

SUMMARY

Embodiments described herein include a retaining ring for a polishing system, the retaining ring comprising a process-resistant coating over a portion of the retaining ring, the coating comprising a vapor deposited, process-resistant material and having a thickness less than about 100 µm. The process-resistant material may be selected from the group consisting of linear polyparaxylylene, chlorinated linear polyparaxylylene, cross-linked polyparaxylylene, polyether ether ketones, polytetrafluoroethylene, fluorinated ethylene-propylene polymer, and ethylene tetrafluoroethylene polymer. A surface modification treatment may be applied before and/or after applying the coating.

BRIEF DESCRIPTION OF THE DRAWINGS

So that the manner in which the above-recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A process-resistant coating may be applied to a retaining ring to improve durability of the retaining ring. The process-resistant coating may be a thin, conformal coating of a material that is resistant to chemical and physical degradation. The coating may be applied to a substantially constant thickness, or different thicknesses may be applied to areas with different wear loading.

Figure 1:
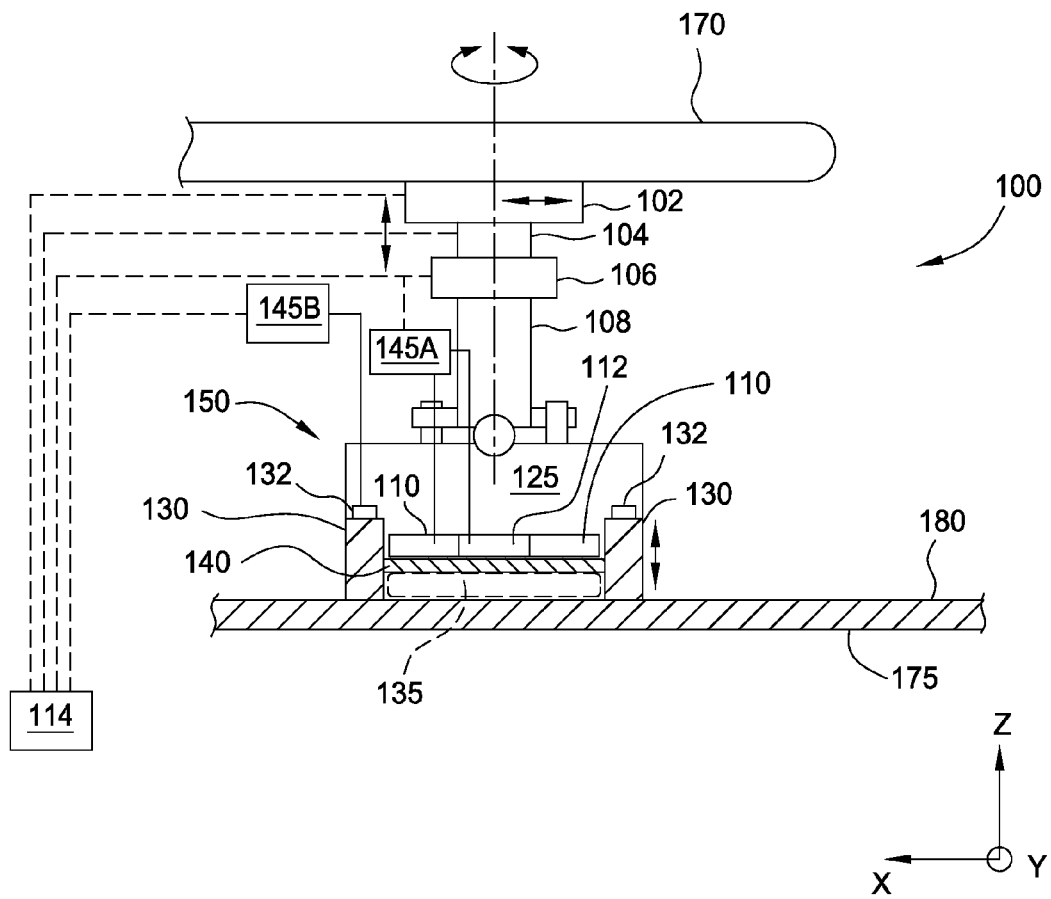
FIG. 1 is a partial cross-sectional view of a polishing apparatus according to one embodiment.

FIG. 1 is a partial cross-sectional view of a polishing apparatus 100 according to one embodiment. A carrier head 150 holds a substrate 135 (shown in phantom) in contact with a polishing surface 180 of a polishing pad 175. The carrier head 150 is coupled to a shaft 108, which is coupled to a motor 102, which is in turn coupled to an arm 170. The motor 102 moves the carrier head 150 laterally in a linear motion (X and/or Y direction) relative to the arm 170. The carrier head 150 also includes an actuator or motor 104 to move the carrier head 150 in the Z direction relative to arm 170 and/or the polishing pad 175. The carrier head 150 is also coupled to a rotary actuator or motor 106 that rotates the carrier head 150 about a rotational axis relative to the arm 170. The motors 104, 102, and 106 disposed on or coupled to the carrier head 150 position the carrier head 150 relative to the polishing surface 180 of the polishing pad 175, which may be rotated. In one embodiment, the motors 104, 102, and 106 rotate the carrier head 150 relative to the optionally rotating polishing surface 180 as well as provide a down-force to urge the substrate 135 retained therein against the polishing surface 180 of the polishing pad 175 during processing.

The carrier head 150 includes a body 125 circumscribed by a retaining ring 130. The carrier head 150 also contains one or more bladders 110/112 that are adjacent to a flexible membrane 140. The flexible membrane 140 contacts a backside of the substrate 135 when the substrate 135 is retained in the carrier head 150. The bladders 110/112 are coupled to a first variable pressure source 145A that selectively delivers a fluid to the bladders 110/112 to apply force to the flexible membrane 140. In one embodiment, the bladder 110 applies force to an outer zone of the flexible membrane 140 while the bladder 112 applies force to a central zone of the flexible membrane 140. Forces applied to the flexible membrane 140 from the bladders 110/112 are transmitted to portions of the substrate 135 and may be used to control the edge to center pressure profile that the substrate 135 asserts against the polishing surface 180 of the polishing pad 175. The first variable pressure source 145A is configured to deliver fluids to each of the bladders 110/112 independently in order to control forces to discrete regions of the substrate 135 through the flexible membrane 140. Additionally, vacuum ports (not shown) may be provided in the carrier head 150 to apply suction to the backside of the substrate 135 facilitating retention of the substrate 135 in the carrier head 150. Examples of a carrier head 150 that may be adapted to benefit from the invention include the TITAN HEAD™, the TITAN CONTOUR™ and the TITAN PROFILER™ carrier heads, which are available from Applied Materials, Inc. of Santa Clara, Calif., among others.

In one embodiment, the retaining ring 130 is coupled to the body 125 by an actuator 132. The actuator 132 is controlled by a second variable pressure source 145B. The second variable pressure source 145B provides or removes fluid from the actuator 132 which causes the retaining ring 130 to move relative to the body 125 of the carrier head 150 in at least the Z direction. The second variable pressure source 145B is adapted to provide the Z directional movement of the retaining ring 130 independent of movement provided by the motor 104. The second variable pressure source 145B may provide movement of the retaining ring 130 by applying negative pressure or positive pressure to the actuator 132 and/or the retaining ring 130. In one aspect, pressure is applied to the retaining ring 130 to urge the retaining ring 130 toward the polishing surface 180 of the polishing pad 175 during a polishing process. Each of the first variable pressure source 145A and the second variable pressure source 145B may be coupled with a controller 114 that operates the pressure sources 145A/145B to control pressures to zones of the substrate 135 during a polishing process. The actuators 102, 104, and 106 may likewise be coupled to the controller 114 to control movement of the substrate 135 during the polishing process. In this way, the controller 114 may execute a polishing recipe provided by instructions from a computer included in, or separate from, the controller 114.

The retaining ring 130 may contact the polishing surface 180 during the polishing process. The retaining ring 130 may also facilitate transportation of the polishing fluid on the polishing surface 180 and create heat due to friction from contact with the polishing surface 180. The fluid transportation and generated heat may be utilized to advantage during a polishing process. The contact with the polishing surface 180 causes the retaining ring 130 to wear. The wear of surfaces of the retaining ring 130 affect the polishing process and the retaining ring 130 will eventually require replacement.

Figure 2A:
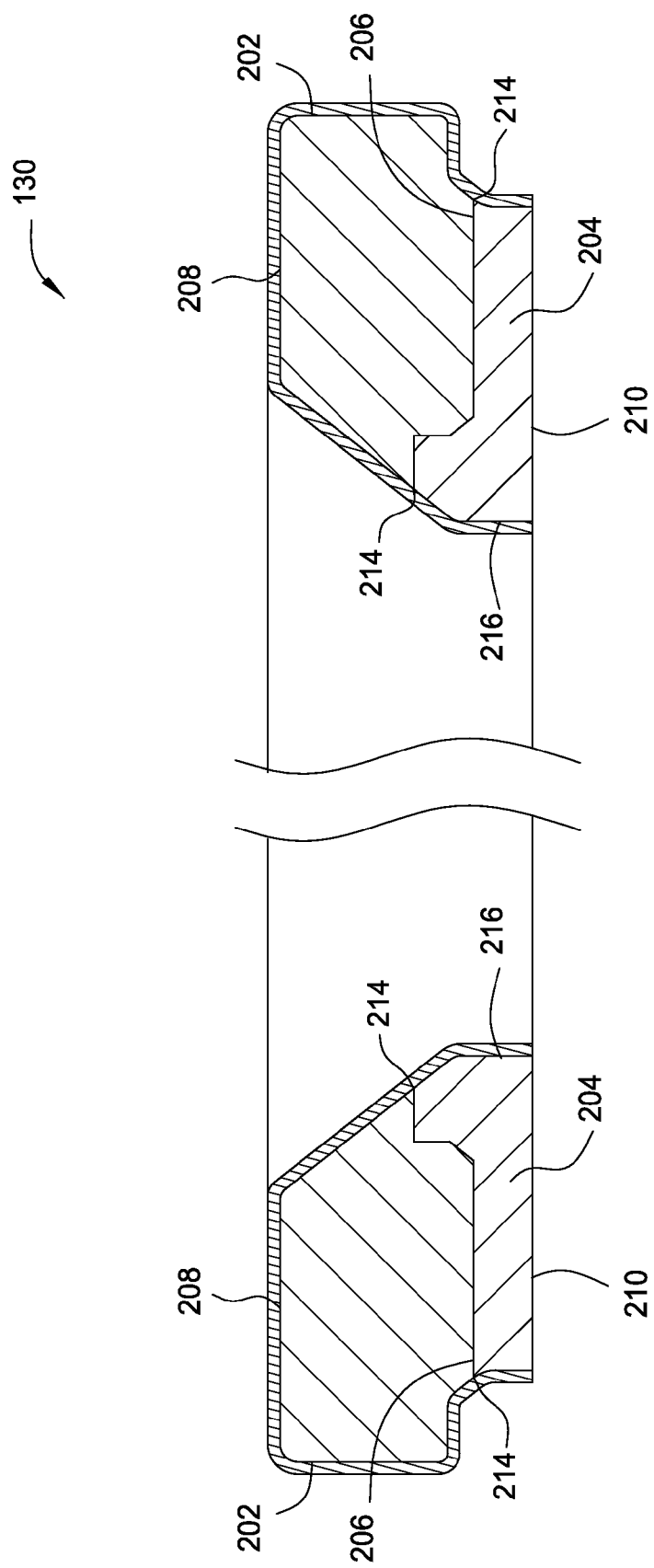
FIG. 2A is a cross-sectional view of a retaining ring with a process-resistant coating according to one embodiment.

FIG. 2A is a cross-sectional view of the retaining ring 130 having a process-resistant coating 212. The retaining ring 200 has an first portion 202 and a second portion 204. The first portion 202 and the second portion 204 may be the same material or a different material. The first portion 202 and the second portion 204 may be joined at an interface 206. Alternately, the first portion 202 and the second portion 204 may be portions of a unitary retaining ring body. If the first portion 202 and the second portion 204 are different materials, the first portion 202 and the second portion 204 may be joined at the interface 206 by an adhesive material, such as an epoxy material, a urethane material, or an acrylic material.

The first portion 202 may be stainless steel, aluminum, molybdenum, or another process-resistant metal or alloy, or a ceramic or a ceramic filled polymer. The second portion 204 may be metal or plastic, and may be the same material as the first portion 202 or a different material. The first portion 202 and the second portion 204 may be the same metal or alloy or different metals or alloys. The second portion 204 may be a plastic such as polyphenylene sulfide (PPS), polyethylene terephthalate, polyetheretherketone, polybutylene terephthalate, Ertalyte TX, PEEK, Torlon, Delrin, PET, Vespel, or Duratrol.

In one embodiment, the first portion 202 is stainless steel or ceramic and the second portion 204 is plastic. The interface 206 may be substantially planar, or the interface 206 may be non-planar, as shown in the embodiment of FIG. 2A. The first portion 202 and the second portion 204 may be shaped to fit together so that the interface 206 is lengthened and adhesion of the upper and lower portions 202/204 is improved.

A process-resistant coating 212 covers surfaces of the retaining ring 200 that may be exposed to process conditions and/or prone to release of metals and/or accumulated process materials. In the embodiment of FIG. 2A, the first portion 202 is covered, including the top surface 208, which may be an attachment surface for attaching the retaining ring to the carrier head 150 (FIG. 1). Side surfaces 216 of the second portion 204 are also covered. A process-facing surface 210 of the second portion 204 is uncovered in the embodiment of FIG. 2A. The process-resistant coating 212 has a smooth, conformal surface substantially free of defects such as pinholes. The process-resistant coating 212 may be a hydrophobic material that resists chemical interaction with process fluids, such as a polymeric material selected based on the chemistry of the polishing fluid to be used to process the substrate 135 in the polishing apparatus 100. The polymeric material may be a carbon-containing material such as parylene (polyparaxylylene), for example Parylene C (chlorinated linear polyparaxylylene), Parylene N (linear polyparaxylylene), and Parylene X (cross-linked polyparaxylylene). Other carbon-containing materials that may be used include PEEK (polyether ether ketones) and diamond-like carbon (DLC).

In some embodiments, the first portion 202 may be encapsulated by the second portion 204, such that no surface of the first portion 202 is exposed. In embodiments wherein the first portion 202 has exposed surfaces, the interface 206 has exposure points 214. The exposure points 214 can be especially vulnerable to chemical attack and wear from the processing environment since the interface 216 is filled with an adhesive material that is less resistant to the processing environment than the material of either the first portion 202 or the second portion 204. In operation, the edge of the substrate 135 may contact the inner side surface 216 of the retaining ring 200, causing wear to the inner side surface 216. Processing fluids may also come into contact with the inner side surface 216 and the exposure points 214 of the interface 216. Active chemicals in the processing fluids may attack materials at the exposure points 214, and abrasive components of the processing fluids may accelerate degradation of the retaining ring 200 at the exposure points 214. To protect the exposure points 214, the process-resistant coating 212 may extend to cover the exposure points 214, as shown in FIG. 2A.

Figure 2B:
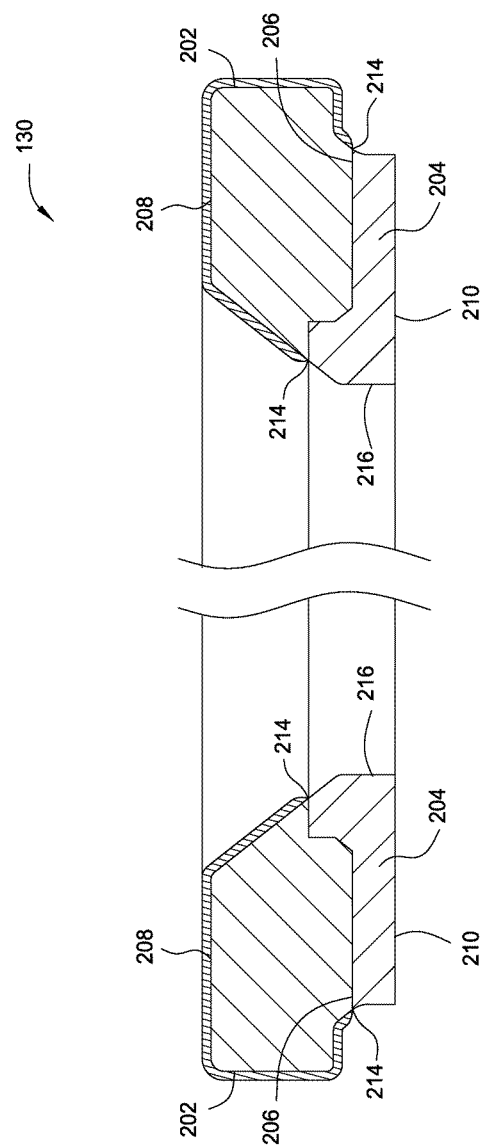
FIG. 2B is a cross-sectional view of a retaining ring with a process-resistant coating according to another embodiment.

FIG. 2B is a cross-sectional view of a retaining ring 250 with a process-resistant coating 252 according to another embodiment. The embodiment of FIG. 2B is similar to the embodiment of FIG. 2A in most respects. The process-resistant coating 252 of the retaining ring 250 covers the first portion 202 and does not cover the second portion 204. As demonstrated by the embodiment of FIG. 2B, the process-resistant coating may be applied to cover any desired surfaces of a retaining ring. In a retaining ring wherein the first portion 202 is a metal support portion and the second portion 204 is a plastic pad-facing portion, the process-resistant coating may be applied to cover a portion of the metal support portion, all of the metal support portion and none of the plastic pad-facing portion, all of the metal support portion and a portion of the plastic pad-facing portion, or all of the metal support portion and all of the plastic pad-facing portion except for the contact surface of the plastic pad-facing portion.

The process-resistant coating 212 is a conformal coating, and may have a substantially constant thickness less than about 100 μm, such as between about 1 μm and about 100 μm, such as between about 5 μm and about 50 μm, for example about 5 μm to about 15 μm, for example about 14 μm. Alternately, thickness of the coating 212 may vary according to wear profiles along the surface of the retaining ring 200. In higher wear areas, the coating 212 may be formed to a higher thickness, if desired. For example, if the inner side surface 216 of the second portion 204 has a higher wear profile than the top surface 208 of the first portion 202, the coating 212 may be formed with a thickness that is higher along the inner side surface 216 than along the top surface 208.

The process-resistant coating 212 may be formed by vapor deposition on selected surfaces of the retaining ring 200. Coatings comprising various types of parylenes may be formed by subliming and pyrolyzing the paracyclophane dimer of para-xylylene, and exposing surfaces of the retaining ring 200 to the resulting vapor. A processing chamber (not shown) may be used to stage the retaining ring for vapor deposition, and any convenient method may be used to mask areas of the retaining ring that are not desirous of covering with the process-resistant coating. The retaining ring may be maintained at ambient temperature for deposition of the process-resistant coating. The coating is formed in a vacuum process at a pressure of 1 Torr or less. Multiple rings may be coated concurrently in a single processing chamber, or rings may be coated individually.

Alternately, a thermal spray or flame spray process may be used to produce pyrolyzed dimer and direct the dimer to the retaining ring. A vaporizer containing paracyclophane may feed warm paracyclophane containing vapor at a temperature of 150° C. or higher to a flame sprayer in a stream with a fuel mixture, such as acetylene and oxygen, or in a separate stream from the fuel mixture. Inert gases may be used to facilitate flow of components through the sprayer. Combustion of the fuel mixture raises the temperature of the dimer vapor to a pyrolysis temperature, and the resulting pyrolyte flows toward the retaining ring in a jet.

Adhesion of the process-resistant coating may be improved by performing a pre-treatment on surfaces of the retaining ring to be coated prior to applying the process-resistant coating. The pre-treatment process may comprise exposing the surfaces to be coated to a silane containing gas mixture to condition the surfaces and/or add roughness to the surfaces prior to forming the process-resistant coating. The retaining ring may disposed on a support in a processing chamber for exposure to the silane containing gas mixture. The silane containing gas mixture may be activated, for example by forming a plasma. The retaining ring is typically exposed to the silane containing gas mixture for about 1 second to about 60 seconds at a temperature of about 200° C. to about 600° C. to etch desired surfaces of the retaining ring lightly. The etching creates a texture, or roughness, on the desired surfaces to enhance adhesion of the process-resistant coating.

After forming the process-resistant layer on the desired surfaces of the retaining ring, the process-resistant layer may be enhanced by surface modification process. A post-treatment with an etching or deposition gas such as silane or a silane containing gas mixture may be used to impart a texture to the surface. The post-treatment may be performed at conditions similar to those described above. Texturing the surface of the process-resistant layer may enhance hydrophobic qualities of the process-resistant surface, reducing the tendency of process residues to adhere to, and/or accumulate on, the process-resistant surface.

The coatings described herein are generally highly conformal, chemically resistant, highly pure, and physically smooth. Such coatings may be used on other components of a semiconductor substrate processing system, such as polishing head fixtures, shields, covers, sweep arm assemblies, plating contacts, lift fingers, robot arms and assemblies, and the like.

The retaining rings described herein may be refurbished from time to time. After a certain period of use, the pad-facing surfaces and substrate contact surfaces of a retaining ring may become worn and degraded to a point that further use of the retaining ring is unproductive. When a retaining ring has a metal support portion adhered to a plastic pad-facing portion, the pad-facing portion may be removed, the metal support portion may be cleaned and reconditioned, and a new pad-facing portion applied with adhesive. Prior to or after removing the pad-facing portion, the process-resistant coating may be removed by a plasma process such as exposure to an oxygen containing plasma. The process-resistant coating may also be removed by an abrasive. The process-resistant coating may also be restored, rather than removed. Portions of the process-resistant coating covering surfaces of the plastic pad-facing portion may be removed with the plastic pad-facing portion, and after adhering a new plastic pad-facing portion, the process-resistant coating may be restored to any desired portions of the plastic pad-facing portion.

While the foregoing is directed to embodiments of the invention, other and further embodiments of the invention may be devised without departing from the basic scope thereof.

What is claimed is:

1. A retaining ring for a polishing system, the retaining ring comprising:
   a first portion having a top surface, a bottom surface and side surfaces and wherein the first portion is formed of a plastic;
   a second portion having a upper surface, a lower surface and sidewalls, the second portion disposed on the top surface of the first portion and wherein the second portion is formed of a metal; and
   a process-resistant coating over the metal and not the plastic of the retaining ring, the coating comprising a vapor deposited, process-resistant material and having a thickness less than about 100 μm.

2. The retaining ring of claim 1, wherein the process-resistant material comprises a material selected from the group consisting of linear polyparaxylylene, chlorinated linear polyparaxylylene, cross-linked polyparaxylylene, polyether ether ketones, polytetrafluoroethylene, fluorinated ethylene-propylene polymer, and ethylene tetrafluoroethylene polymer.

3. The retaining ring of claim 2, wherein the process-resistant coating is a conformal coating.

4. The retaining ring of claim 2, wherein the process-resistant coating has a surface that has been textured by a surface modification process.

5. The retaining ring of claim 3, wherein the process-resistant coating contacts a roughened surface of the retaining ring.

6. The retaining ring of claim 5, wherein the process-resistant coating comprises polyparaxylylene.

7. A retaining ring for a chemical mechanical polishing system, the retaining ring comprising:
- a first portion having a top surface, side surfaces and a process facing surface, and wherein the first portion is formed of a plastic;
- a second portion disposed on the top surface of the first portion at an interface and wherein the second portion is formed of a metal; and
- a conformal process-resistant coating over the metal and not the plastic, the coating comprising:
  - a vapor deposited, process-resistant material comprising:
    - a material selected from the group consisting of linear polyparaxylylene, chlorinated linear polyparaxylylene, cross-linked polyparaxylylene, polyether ether ketones, polytetrafluoroethylene, fluorinated ethylene-propylene polymer, and ethylene tetrafluoroethylene polymer.

8. The retaining ring of claim 7, wherein the process-resistant coating has a textured surface.

9. The retaining ring of claim 8, wherein an attachment surface of the retaining ring is covered by the process-resistant coating.

10. The retaining ring of claim 8, wherein the process-resistant coating has a non-uniform thickness.

11. The retaining ring of claim 8, further comprising a first portion, a second portion, and an interface between the first and second portions, wherein the interface is covered by the process-resistant coating.

12. The retaining ring of claim 10, wherein the process-resistant coating contacts a roughened surface of the retaining ring.

13. The retaining ring of claim 7, wherein at least one side of the second portion and two sides of the first portion do not have a coating.

* * * * *